United States Patent
Gill

(10) Patent No.: US 11,670,951 B1
(45) Date of Patent: Jun. 6, 2023

(54) FAST CHARGING SMALL FORM FACTOR MOBILE DEVICE CHARGER WITH QUICK BATTERY SWAP

(71) Applicant: Swaranjit Gill, Livermore, CA (US)

(72) Inventor: Swaranjit Gill, Livermore, CA (US)

( * ) Notice: Subject to any disclaimer, the term of this patent is extended or adjusted under 35 U.S.C. 154(b) by 0 days.

(21) Appl. No.: 17/408,416

(22) Filed: Aug. 21, 2021

Related U.S. Application Data

(60) Provisional application No. 63/068,985, filed on Aug. 21, 2020.

(51) Int. Cl.
*H02J 7/00* (2006.01)

(52) U.S. Cl.
CPC .......... *H02J 7/0045* (2013.01); *H02J 7/0013* (2013.01); *H02J 7/0048* (2020.01)

(58) Field of Classification Search
CPC ....... H02J 7/0045; H02J 7/0048; H02J 7/0013
See application file for complete search history.

(56) References Cited

U.S. PATENT DOCUMENTS

| 8,471,523 B2 * | 6/2013 | Lin | ........................ | H01M 10/46 439/131 |
| 2010/0117592 A1 * | 5/2010 | Lim | .................... | H02J 7/00304 320/101 |
| 2019/0157884 A1 * | 5/2019 | Lin | ........................ | H02J 7/0042 |

* cited by examiner

*Primary Examiner* — Carlos Amaya
(74) *Attorney, Agent, or Firm* — Adibi IP Group, PC; Amir V. Adibi; Andrew C. Palmer

(57) ABSTRACT

A mobile device charger includes a power converter circuit support structure, a power converter circuit, a first and second battery connectors, and an enclosure. The power converter circuit is disposed on the power converter circuit support structure. In one example, the power converter circuit support structure is a PCB (printed circuit board) and the battery connectors are battery clips. The PCB slides in and out of the enclosure providing quick access to electrical components of the charger. When a battery is inserted between the battery clips, the power converter generates an output charging supply usable to charge a mobile device. The PCB extends in a longitudinal fashion parallel to the battery thereby providing space for high-output power components without sacrificing form factor. The power converter circuit generates an output charging supply of at least two and four-fifths watts per cubic inch (2.8 W/in$^3$) of the volume.

2 Claims, 17 Drawing Sheets

POWER CONVERTER CIRCUIT SYSTEM

POWER CONVERTER CIRCUIT SYSTEM

POWER CONVERTER CIRCUIT SYSTEM
(BATTERY INSERTED)

POWER CONVERTER ASSEMBLY
(SIDE VIEW)

POWER CONVERTER ASSEMBLY SLIDING IN AND OUT OF ENCLOSURE

BASE OF MOLDED CABLE ATTACHMENT

MOLDED CABLE ATTACHMENT

POWER CONVERTER CIRCUIT SUPPORT STRUCTURE (EX: PCB)
(TOP DOWN VIEW)

POWER CONVERTER CIRCUIT SUPPORT STRUCTURE
(BOTTOM UP VIEW)

EMBODIMENT OF A POWER CONVERTER CIRCUIT SUPPORT STRUCTURE WITH A COPPER LAYER TOP SIDE
(TOP DOWN VIEW)

EMBODIMENT OF A POWER CONVERTER CIRCUIT SUPPORT STRUCTURE WITH A COPPER LAYER BOTTOM SIDE (BOTTOM UP VIEW)

POWER CONVERTER CIRCUITRY

DIAGRAMS SHOWING EXAMPLE DIMENSIONS OF ENCLOSURE

| | |
|---|---|
| MASS | 0.11864 POUNDS |
| VOLUME | 3.28395 IN$^3$ |
| SURFACE AREA | 14.00109 IN$^2$ |

TABLE 49

| PRODUCT | NOVEL MOBILE DEVICE CHARGER (SEE FIG. 1) | ANKER POWER CORE MINI (SEE FIG. 14) | ANKER POWER CORE 5000 (SEE FIG. 15) | ANKER ASTRO E1 (SEE FIG. 16) |
|---|---|---|---|---|
| VOLUME | 3.28395 IN$^3$ | 2.373 IN$^3$ | 5.64 IN$^3$ | ~5.814 IN$^3$ |
| WATTS/IN$^3$ | 3.04 WATTS/IN$^3$ | 2.1 WATTS/IN$^3$ | 1.77 WATTS/IN$^3$ | 1.72 WATTS/IN$^3$ |

COMPARISON TABLE 50

PACKAGING A MOBILE CHARGER

PROVIDING A MOBILE CHARGER

FAST CHARGING SMALL FORM FACTOR MOBILE DEVICE CHARGER WITH QUICK BATTERY SWAP

CROSS REFERENCE TO RELATED APPLICATIONS

This application claims the benefit under 35 U.S.C. § 119 from U.S. Provisional Patent Application No. 63/068,985, entitled "Fast Charging Small Form Factor Mobile Device Charger With Quick Battery Swap," filed on Aug. 21, 2020, the subject matter of which is expressly incorporated herein by reference.

TECHNICAL FIELD

The present invention relates generally to power electronics, and more specifically, to mobile charging devices.

BACKGROUND INFORMATION

Mobile chargers are commonly used to recharge mobile devices. Mobile phones, tablets, and other portable devices have batteries that provide for prolonged mobile use. When outside for extended periods of time, such mobile devices run out of stored energy within their batteries. Mobile chargers reduce the need to be tethered to a wall outlet for extended periods of time. Instead, mobile chargers allow for on-the-go charging. However, mobile chargers tend to take too long to recharge the mobile device because phones have become more powerful and their power demands have increased.

SUMMARY

A mobile device charger includes a power converter circuit support structure, a power converter circuit, a first and second battery connectors, and an enclosure. The power converter circuit is disposed on the power converter circuit support structure. In one example, the power converter circuit support structure is a PCB (printed circuit board) and the battery connectors are battery clips. The PCB slides in and out of the enclosure providing quick access to electrical components of the charger. When a battery is inserted between the battery clips, the power converter receives an input voltage from the battery and generates an output charging supply onto an output charging port usable to charge a mobile device. An input charging port is used to recharge the battery.

The PCB extends in a longitudinal fashion parallel to the battery thereby providing space for high-output power components without sacrificing form factor. The mobile device charger has a cylindrical form factor, also referred to as a "lipstick" type mobile charger. The small form factor of the mobile device charger consumes minimal space and provides high portability without sacrificing fashion or storage limitations. The power converter circuit generates an output charging supply of at least two and four-fifths watts per cubic inch (2.8 W/in$^3$) of the volume. This provides fast charging relative to the small form factor as compared to conventional chargers.

The mobile device charger provides many advantages over conventional mobile chargers. Most state-of-the-art mobile chargers are bulky, inconvenient and are heavy to carry around. Typical ultra small mobile chargers do not have a connector to connect directly to the phone charger port. Commercially available ultra small mobile chargers do not include an additional USB-A female port to plug in a second device.

In one embodiment, a fuel gauge is included that indicates an amount of remaining battery capacity. In another embodiment, a push button switch is provided to selectively enable and disable charging. In yet another embodiment, the mobile device charger includes a light emitting device. The light emitting device operates as a flashlight and is controlled via a switch. In still another embodiment, the battery 12 is a protected battery with additional power management circuitry.

In another embodiment, a novel molded cable attachment is provided. The molded cable attachment is pluggable into a connector of a mobile device charger in accordance with various embodiments. The mobile device charger includes an input connector, an output connector, a base, and a clamp. The input connector and the output connector are disposed along the base. The clamp is attachable to the enclosure of the charger device. The molded cable attachment includes an input connector that connects to an output of the mobile device charger. The molded cable attachment is terminated with an output connector, such as a lightning, USB-C, USB-B, USB-A, or micro-USB connector end. In one embodiment, the molded cable attachment is formed via an overmolding process that encapsulates a cable and a connector.

The molded cable attachment is interchangeable with other molded connectors to support various types of mobile devices. This interchangeability allows the mobile device charger to be usable with different types of mobile devices because various molded cable attachments can be swapped in and out to be used with different types of devices. For example, to charge a USB Type-C device (e.g., Android phone or tablet), a user would attach a USB Type-C molded cable attachment to the mobile device charger. The mobile device charger can be used to charge a lightning type device (e.g., Apple iPhone or iPad) by swapping the USB Type-C molded cable attachment with a lightning molded cable attachment. In this fashion, the mobile device charger is cross-compatible with different types of mobile devices. The user also has the option of charging a mobile device via a cable by connecting the cable directly to the output charger port of the mobile device charger without having to use the molded cable attachment, or charging multiple devices, one device via cable and output charger port and another device via the molded cable attachment. The novel mobile device charger may be provided to consumers without any molded cable attachment or may be provided with one or more molded cable attachments.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
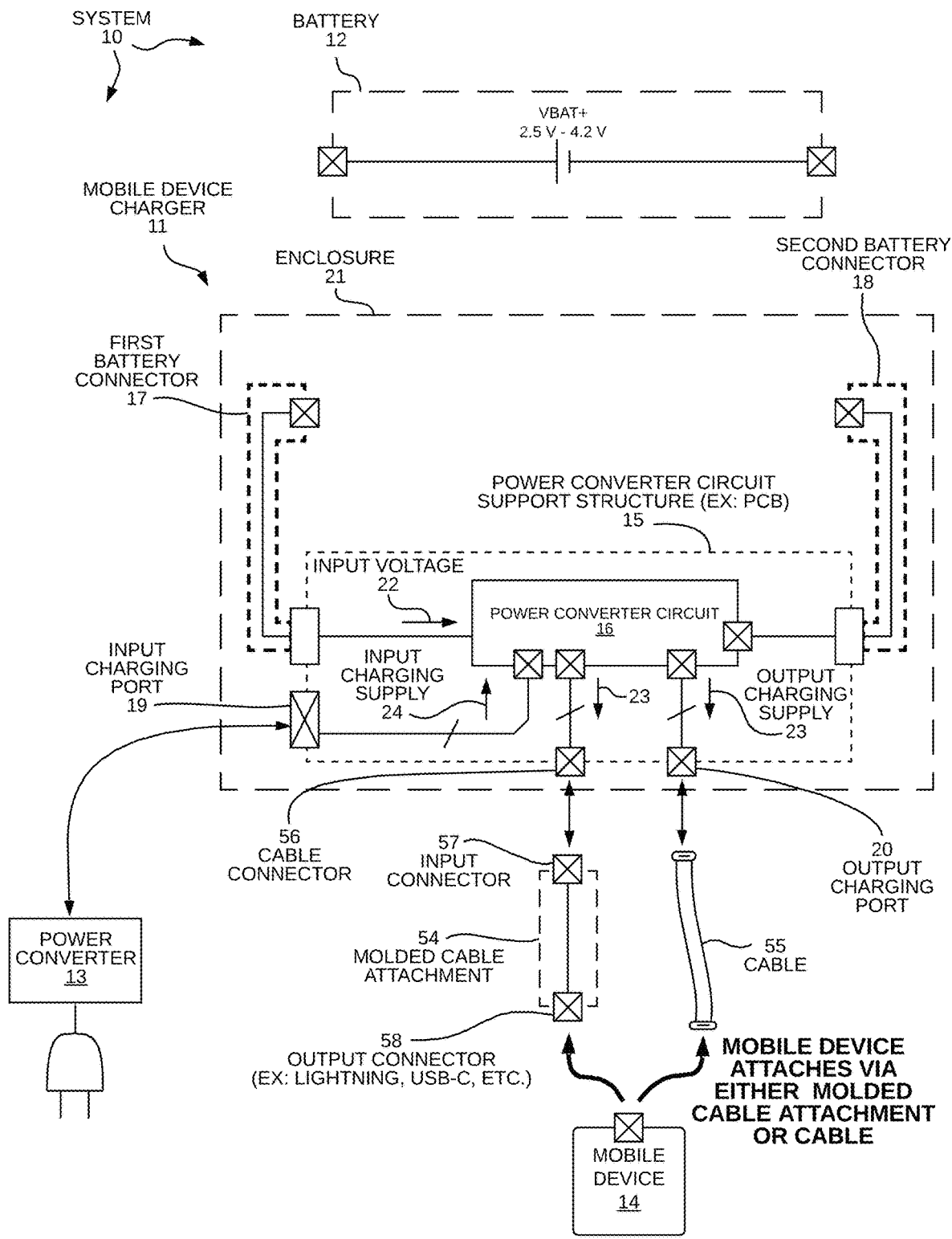
FIG. 1 is a circuit diagram of a power converter circuit system.

FIG. 1 is a circuit diagram of a system 10. System 10 comprises a mobile device charger 11, a battery 12, a power converter 13, and a mobile device 14. The mobile device charger 11 comprises a power converter circuit support structure 15, a power converter circuit 16, a first battery connector 17, a second battery connector 18, an input charging port 19, an output charging port 20, an output charging cable connector 56, and an enclosure 21. The battery 12 generates and outputs a supply voltage VBAT+. When the battery 12 is inserted into and clamped between the first battery connector 17 and the second battery connector 18, the power converter circuit 16 receives an input voltage 22 and generates an output charging supply 23. In one example, the output charging supply 23 has a power level that is greater than nine watts (9W).

The battery 12 is re-chargeable through the input charging port 19. When the battery 12 is connected between the first battery connector 17 and the second battery connector 18, as in FIG. 2, the battery 12 is charged via the first charging port 19 via the power converter 13. The power converter 13 is a rectifier that receives an AC supply from an AC source and outputs a DC voltage supplied to the power converter circuit 16 as an input charging supply 24. The input charging port 19 is selected from the group consisting of: a Universal Serial Bus (USB) type-A port, a USB type-C port, a micro-USB port, and a lightning port.

The mobile device charger 11 charges the mobile device 14 via the output charging port 20 via cable 55 or via a molded cable attachment 54 connected to cable connector 56. The power converter circuit 16 outputs an output charging supply 23 that charges the mobile device 14 via the output charging port 20 molded cable attachment 54 connected to cable connector 56. The mobile device charger 11 charges the mobile device 14 at a maximum current level of at least two amperes (2A) during a charging time period. The output charging port 20 is selected from the group consisting of: a Universal Serial Bus (USB) type-A port, a USB type-C port, a micro-USB port, and a lightning port.

The power converter circuit support structure 15 extends parallel to a side of the battery 12. The battery 12 and the power converter circuit support structure 15 slides in and out of the enclosure 21. This sliding feature of the power converter circuit support structure 15 eases assembly of the device, eases maintenance and repair of components, and permits users to replace the battery 12 without requiring special service technicians to be involved.

In one embodiment, the power converter circuit support structure 15 is a PCB (printed circuit board). The side of the battery 12 does not include any battery contacts and the power converter circuit support structure 15 comprises one and only one PCB 15. The PCB 15 has no more than four conductive layers. In another embodiment, the mobile device charger 11 has more than one PCB. In another embodiment, the PCB 15 has more than four conductive layers.

In one embodiment, each of the first battery connector 17 and the second battery connector 18 is a battery clip. The battery 12 is inserted into and clamped between the first battery clip 17 and the second battery clip 18. The battery 12 is easily swapped into and out of the mobile device charger 11 without having to weld the battery to any terminal. In another embodiment, each of the first battery connector 17 and the second battery connector 18 is a metal tab and contacts of the battery 12 are welded to the metal tabs 17 and 18. In the embodiment of FIG. 1, the mobile device charger 11 has one and only one battery 12. The battery 12 does not include any integrated power management system, such as a power protection circuit.

In accordance with at least one novel aspect, the mobile device charger 11 outputs high power relative to an overall size of the mobile device charger 11. The novel mobile device charger 11 provides fast charging in a small form factor. In one embodiment, enclosure 21 has a volume and the power converter circuit 16 generates an output charging supply 23 of at least two and four-fifths watts per cubic inch (2.8 W/in$^3$) of the volume.

In accordance with another novel aspect, the longitudinal configuration of the power converter circuit support structure 15 yields high power output from the mobile device charger 11 without sacrificing a larger overall form factor of the device. Many commercially available mobile device chargers have smaller power converter circuit support structures that are not parallel to the battery and do not provide as much surface area for high power output electrical components.

Figure 2:
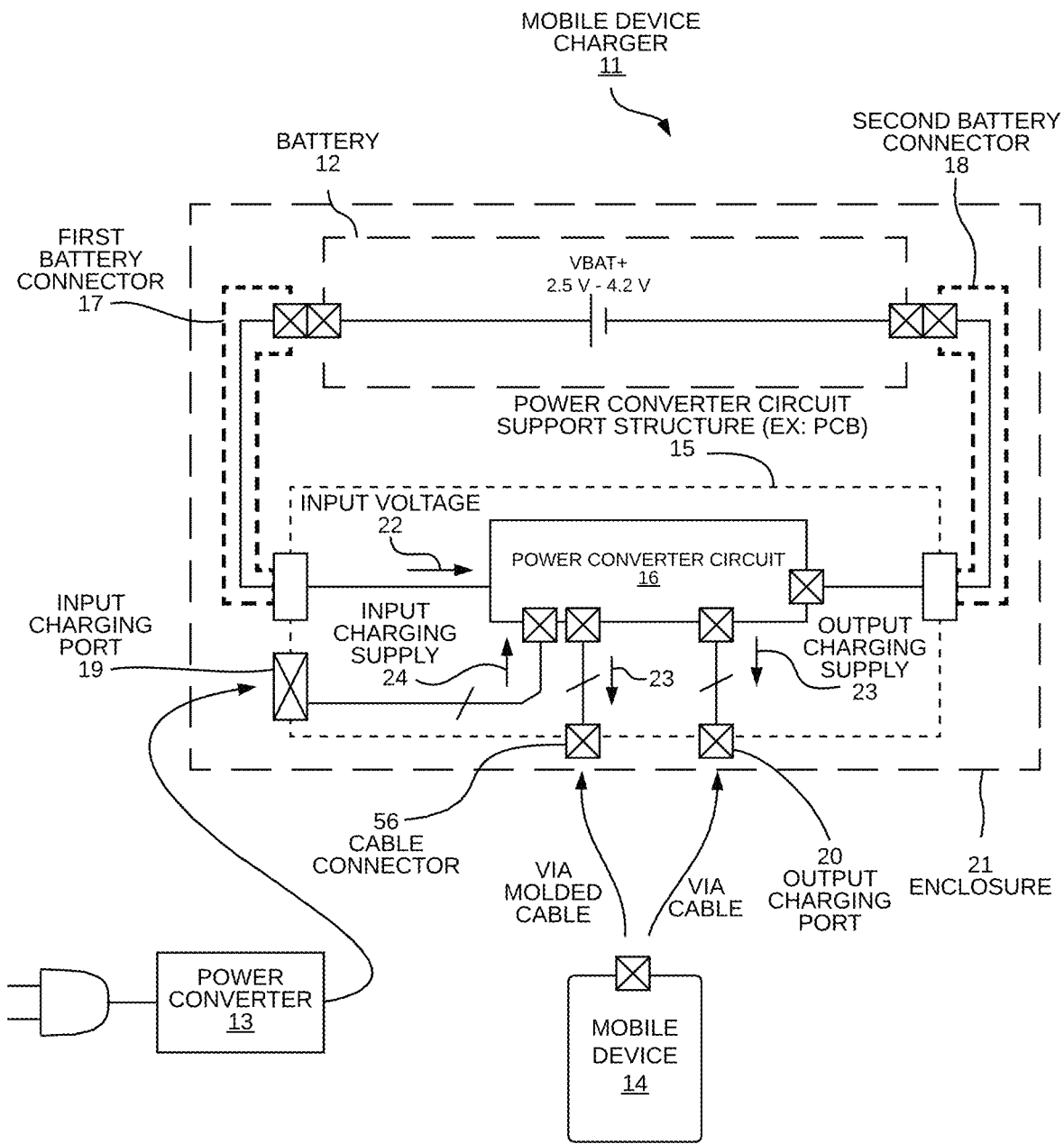
FIG. 2 is a diagram of the power converter circuit system showing a battery inserted into a mobile device charger.

FIG. 2 is a diagram of the system 10 showing the battery 12 inserted into the mobile device charger 11.

Figure 3:
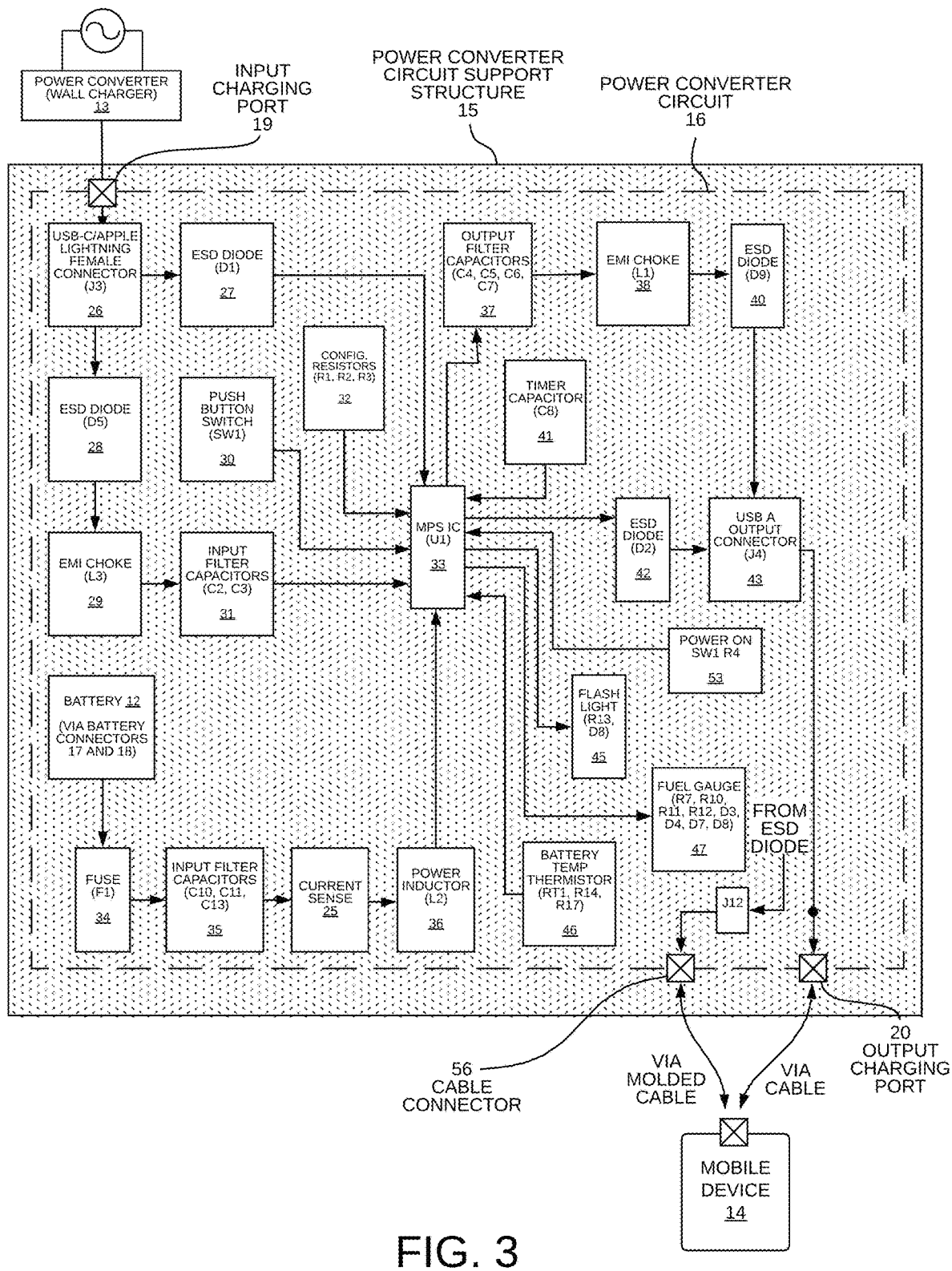
FIG. 3 is a detailed block diagram of a power converter circuit.

FIG. 3 is a detailed block diagram of the power converter circuit 16. The power converter circuit 16 comprises a female connector 26, ESD diodes 27, 28, 40, and 42, an EMI choke 29 and 38, a push button switch 30, input filter capacitors 31, configuration resistors 32, switch mode power supply integrated circuit 33, a fuse 34, current sense circuitry 25, input filter capacitors 35, a power inductor 36, output filter capacitors 37, a timer capacitor 41, an output connector 43, and a flash light 45, battery temperature thermistor 46, a fuel gauge 47, and a cable connector 56. It is appreciated by one of ordinary skill in the art that in various embodiments, some of the above components may be excluded or the power converter circuit 16 might be realized using other power conversion topologies. For additional information on the structure and operation of the power converter circuit 16 and how to configure the various components, see: U.S. Provisional Patent Application Ser. No. 63/068,985 filed on Aug. 21, 2020, the entire subject matter of which is incorporated herein by reference.

Figure 4:
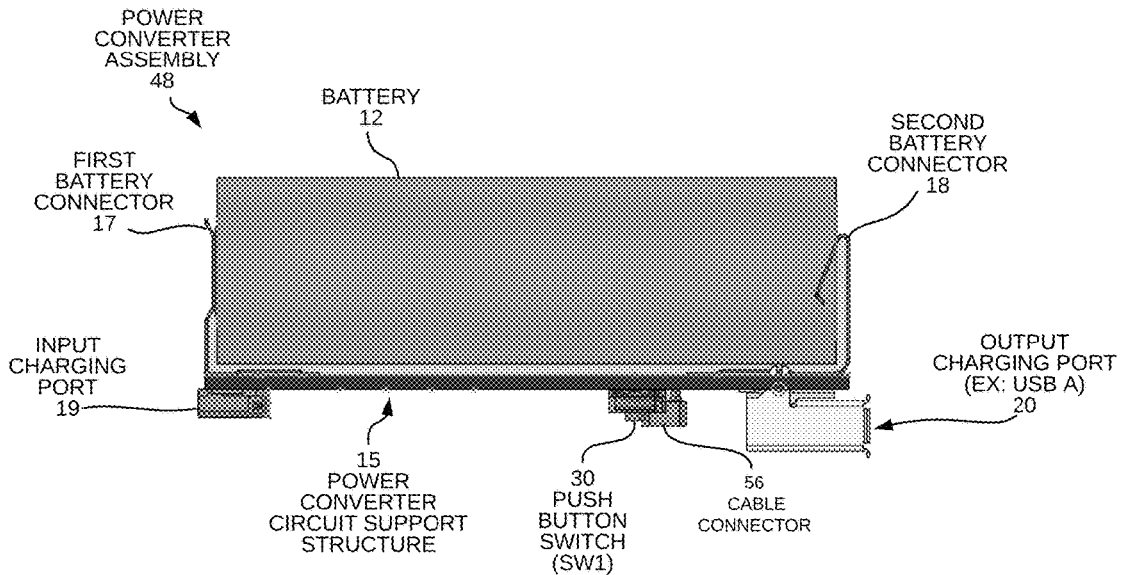
FIG. 4 is a diagram showing a side view of a power converter assembly.

FIG. 4 is a diagram showing a side view of the power converter assembly 48.

Figure 5:
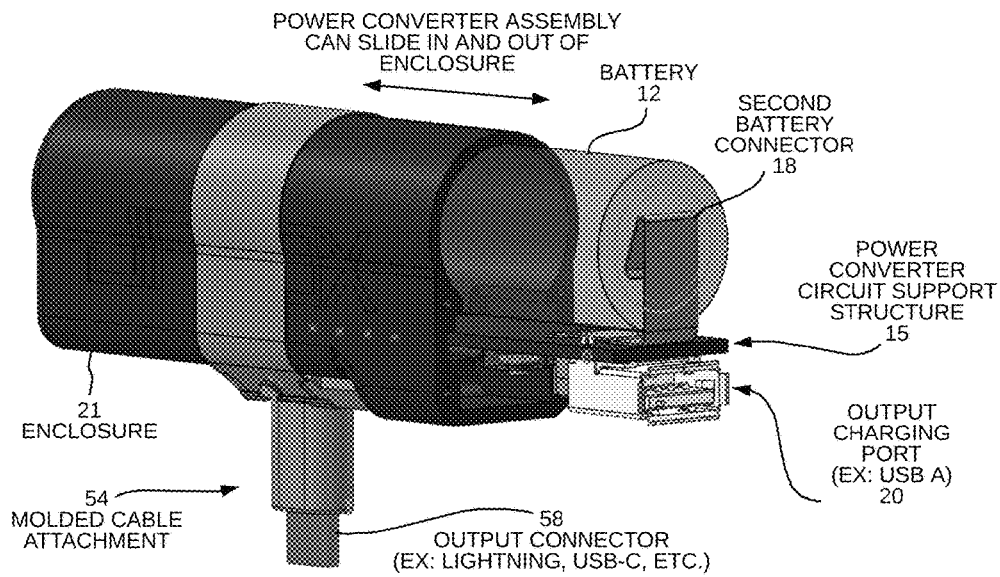
FIG. 5 is a diagram showing a perspective view of a power converter assembly sliding in and out of an enclosure.

FIG. 5 is a diagram showing a perspective view of a power converter assembly 48 sliding in and out of the enclosure 21.

Figure 6:
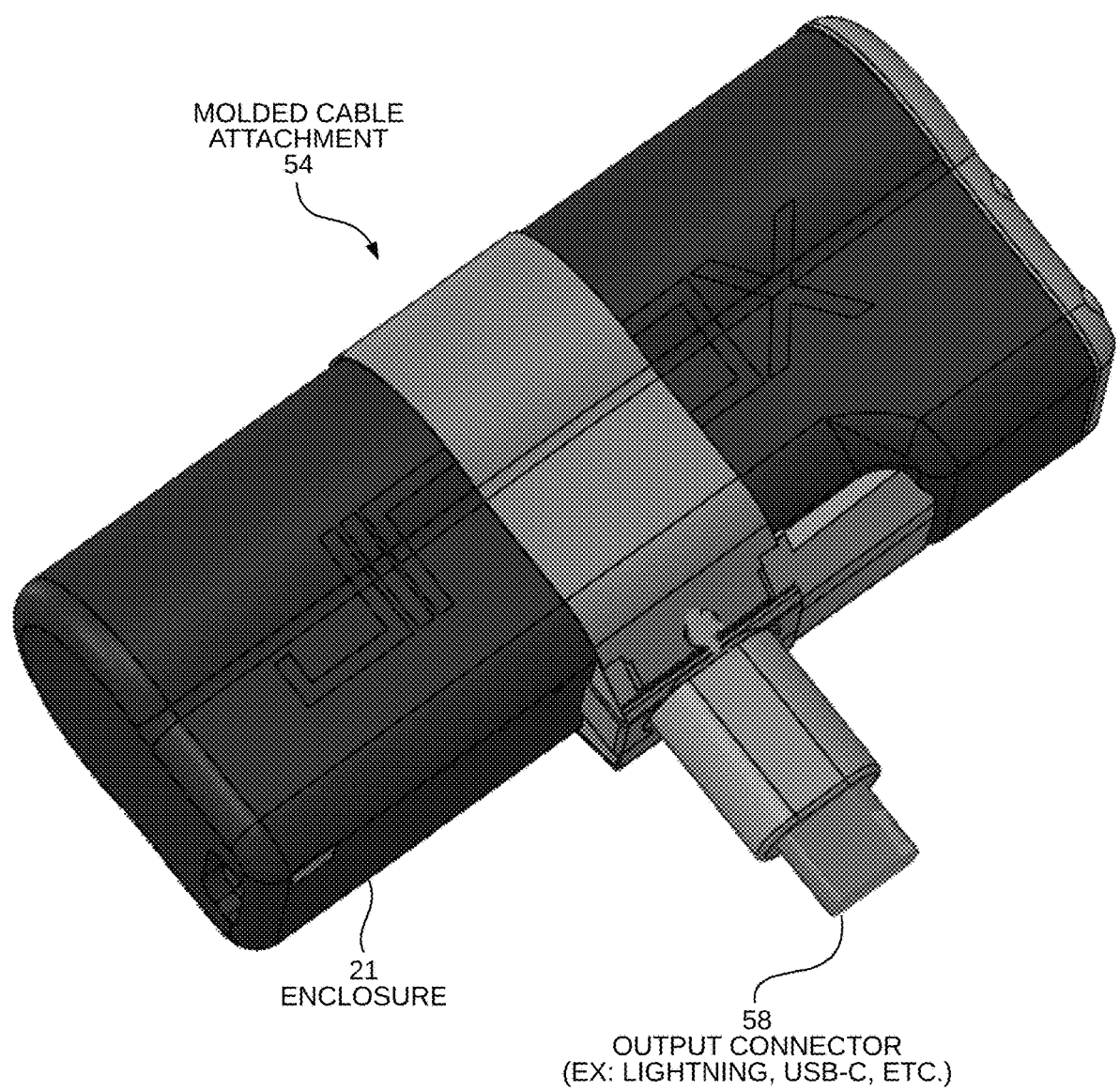
FIG. 6 is a diagram of a molded cable attachment attached to the enclosure of the mobile device charger in accordance with one embodiment.

FIG. 6 is a diagram of a molded cable attachment 54 attached to enclosure 21 in accordance with one embodiment. A device is chargeable by connecting the charging port of the device to the output connector 58 or by connecting the charging port of the device to output charging port 20 (shown in FIG. 5) via a compatible cable.

Figure 7:
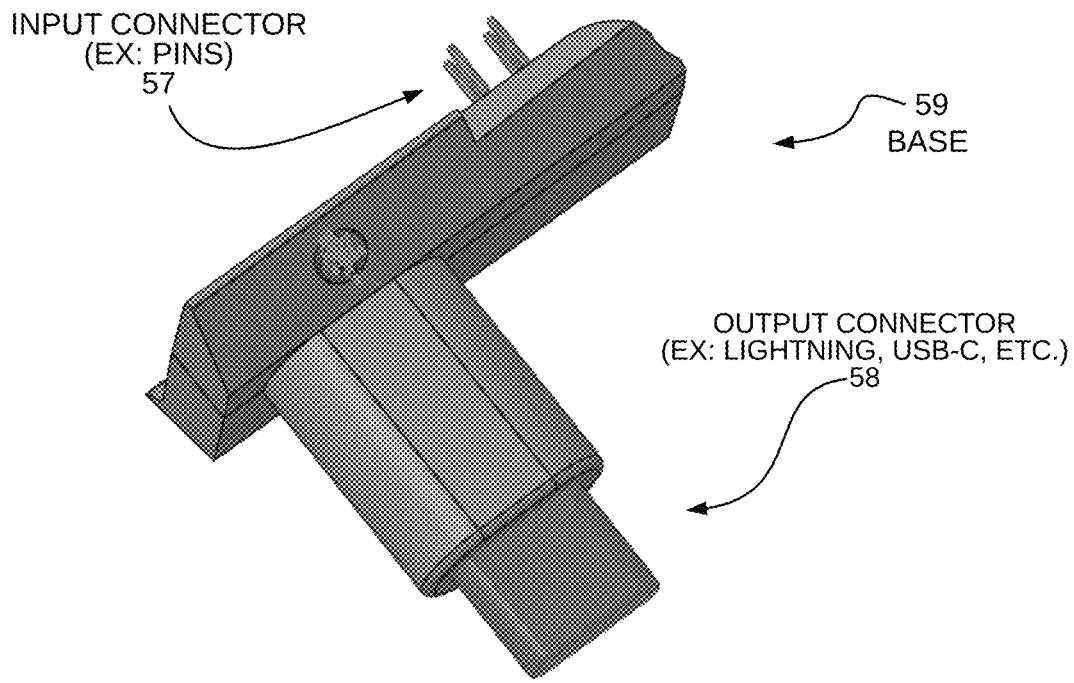
FIG. 7 is a diagram of a base of the molded cable attachment.

FIG. 7 is a diagram of a base 59 of the molded cable attachment 54. The input connector 57 includes a plurality of pins that attach to power circuitry within the mobile device charger 11. The output connector 58 plugs directly into the charger port of the mobile device 14. The molded cable attachment 54 is formed via an overmolding process that encapsulates a cable (not shown) within the base 59 that extends between the input connector 57 and the connector 58.

Figure 8:
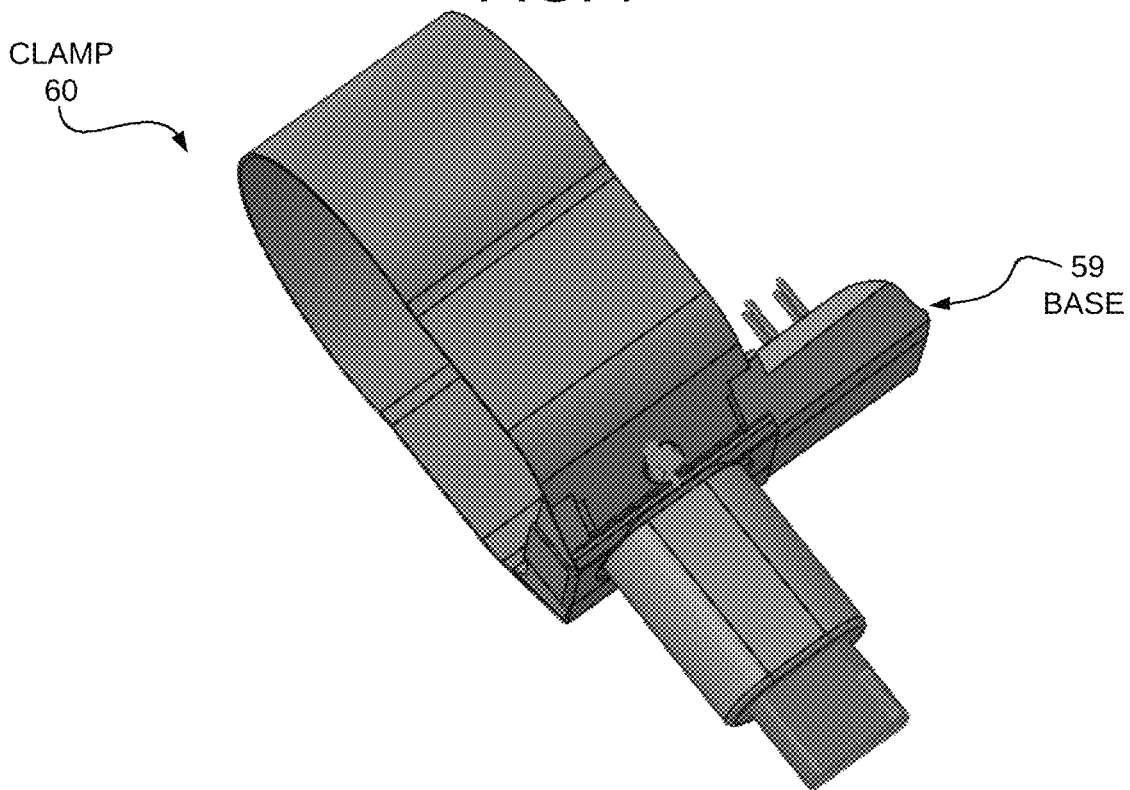
FIG. 8 is a diagram of the molded cable attachment detached from the mobile device charger.

FIG. 8 is a diagram of the molded cable attachment 54 detached from the mobile device charger 11. It is appreciated that the clamp 60 is optional and some embodiments have other mechanical mechanisms suitable for attaching the molded cable attachment 54 to the mobile device charger 11.

Figure 9:
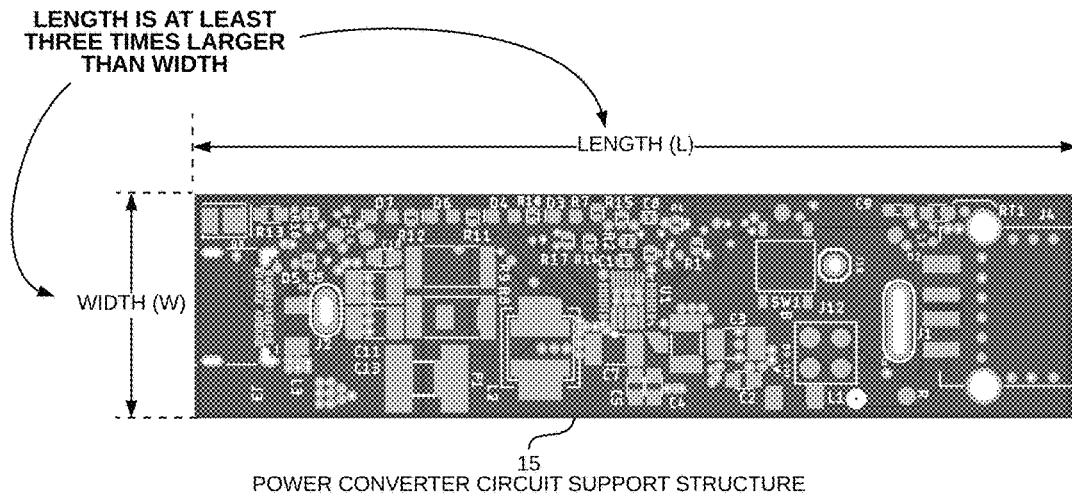
FIG. 9 is a diagram of a top-down view of a power converter circuit support structure.

FIG. 9 is a diagram of a top-down view of the power converter circuit support structure 15. The power converter circuit support structure 15 has a width and a length. The length (L) is more than a factor multiplied by the width (W). In various embodiments, the factor is selected from the group consisting of: three (3.0), three and a quarter, (3.25), three and a third (3.33), three and a half (3.5), and four (4.0). Labels shown on the PCB 15 of FIG. 9 indicate where various components of the power converter circuit 16 are attached during assembly. These labels corresponding to the labels shown in the detailed diagram of power converter circuit 16.

Figure 10:
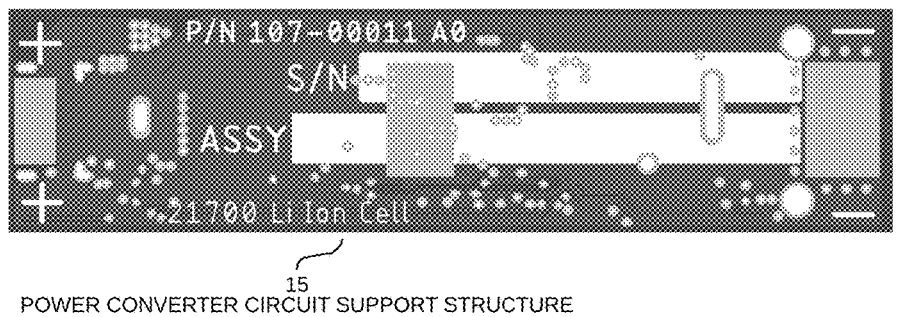
FIG. 10 is a diagram of a bottom-up view of the power converter circuit support structure.

FIG. 10 is a diagram of a bottom up view of the power converter circuit support structure 15.

Figure 11:
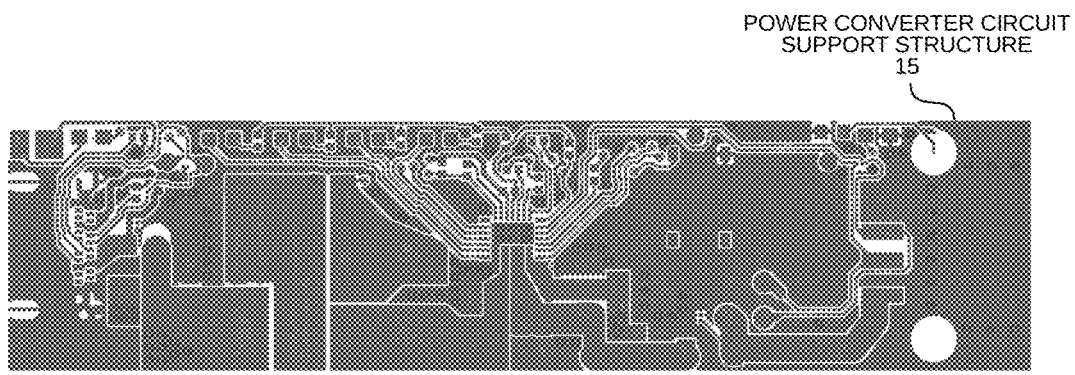
FIG. 11 is another diagram of a top-down view of the power converter circuit support structure.

FIG. 11 is a diagram of a top down view of the power converter circuit support structure 15. In FIG. 11, metal traces are shown that extend throughout the power converter circuit support structure 15.

Figure 12:
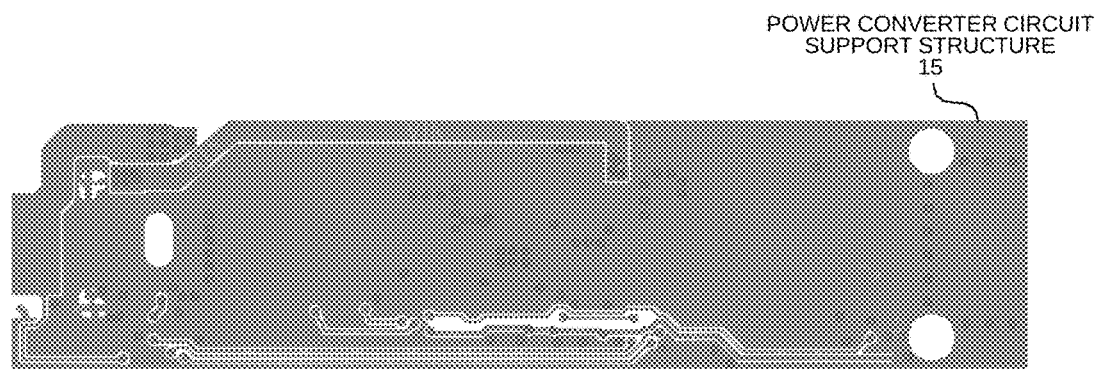
FIG. 12 is another diagram of a bottom-up view of the power converter circuit support structure.

FIG. 12 is a diagram of a bottom up view of the power converter circuit support structure 15.

Figure 13A:
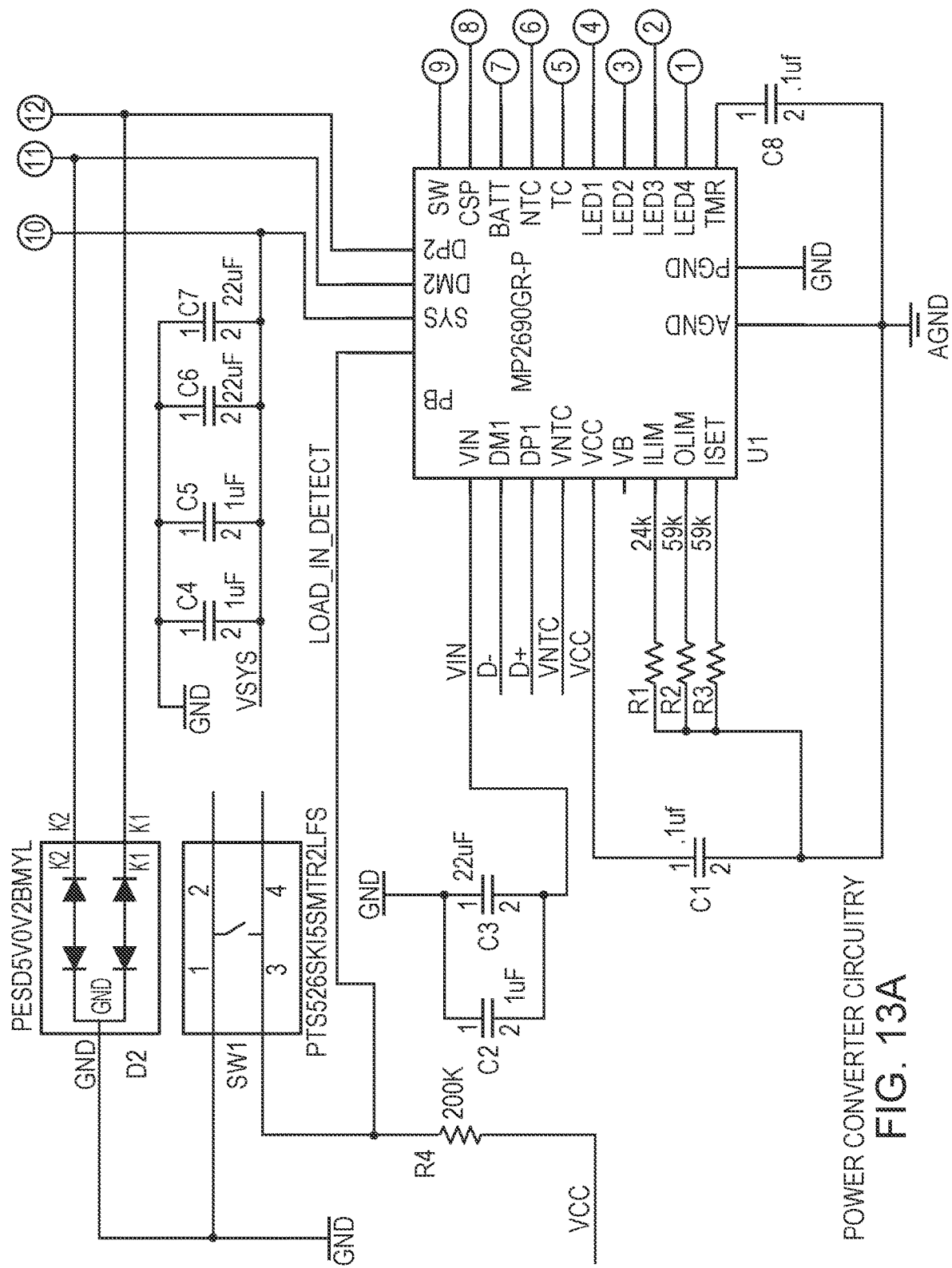
FIG. 13A, FIG. 13B, and FIG. 13C are detailed circuit diagrams of the power converter circuit showing some of the electrical components.
Figure 13B:
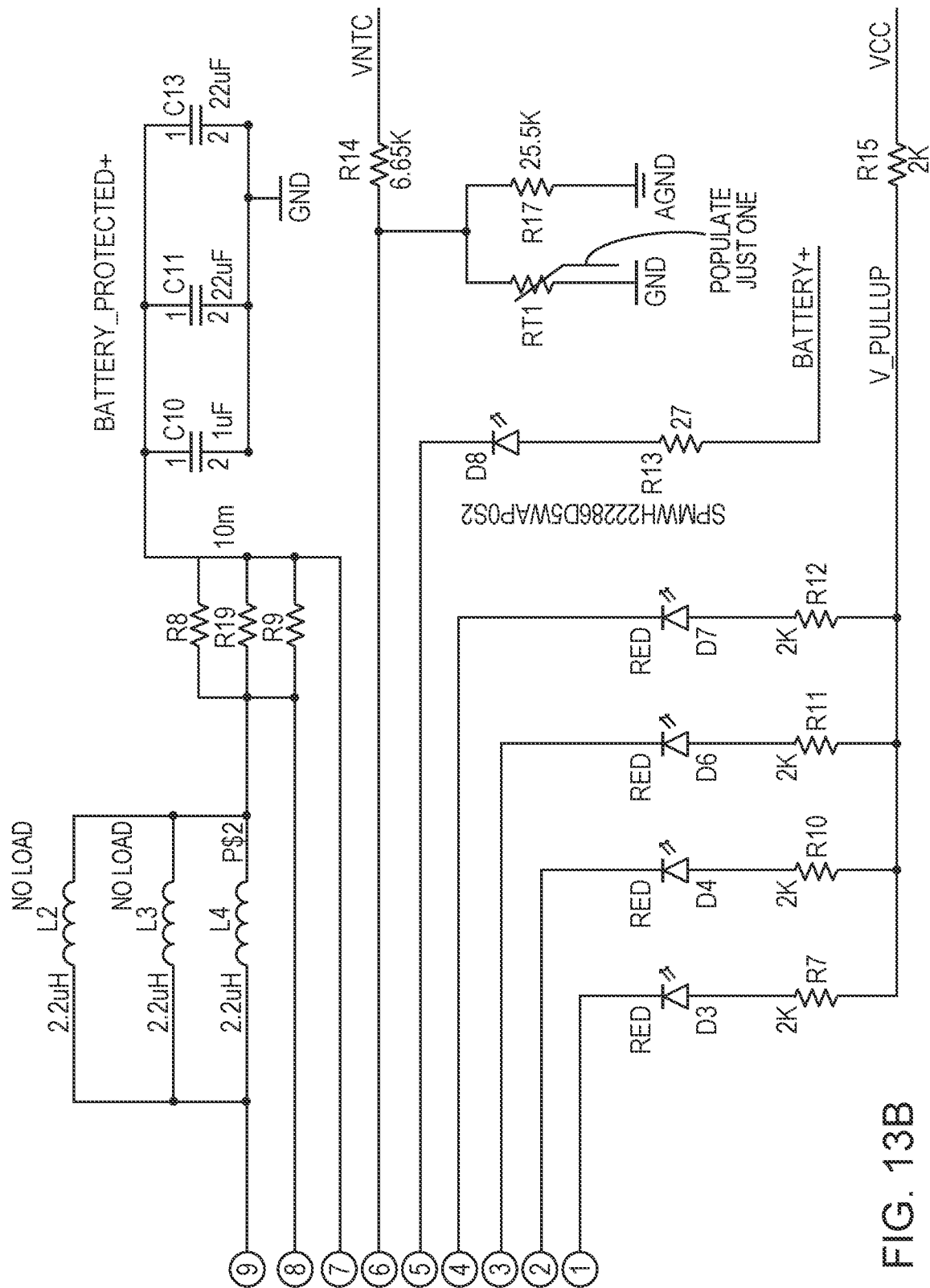
Figure 13C:
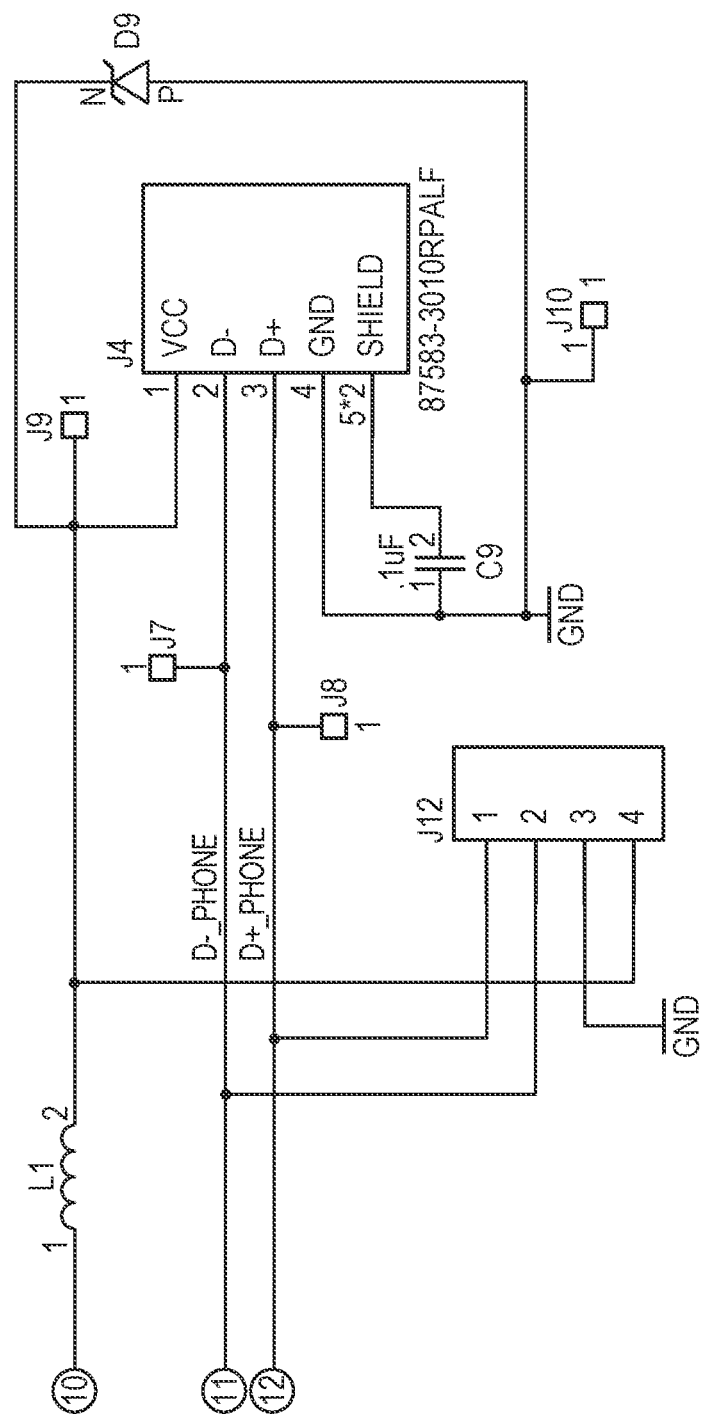

FIG. 13A, FIG. 13B, and FIG. 13C are detailed circuit diagrams of the power converter circuit 16 showing some of the electrical components.

Figure 14:
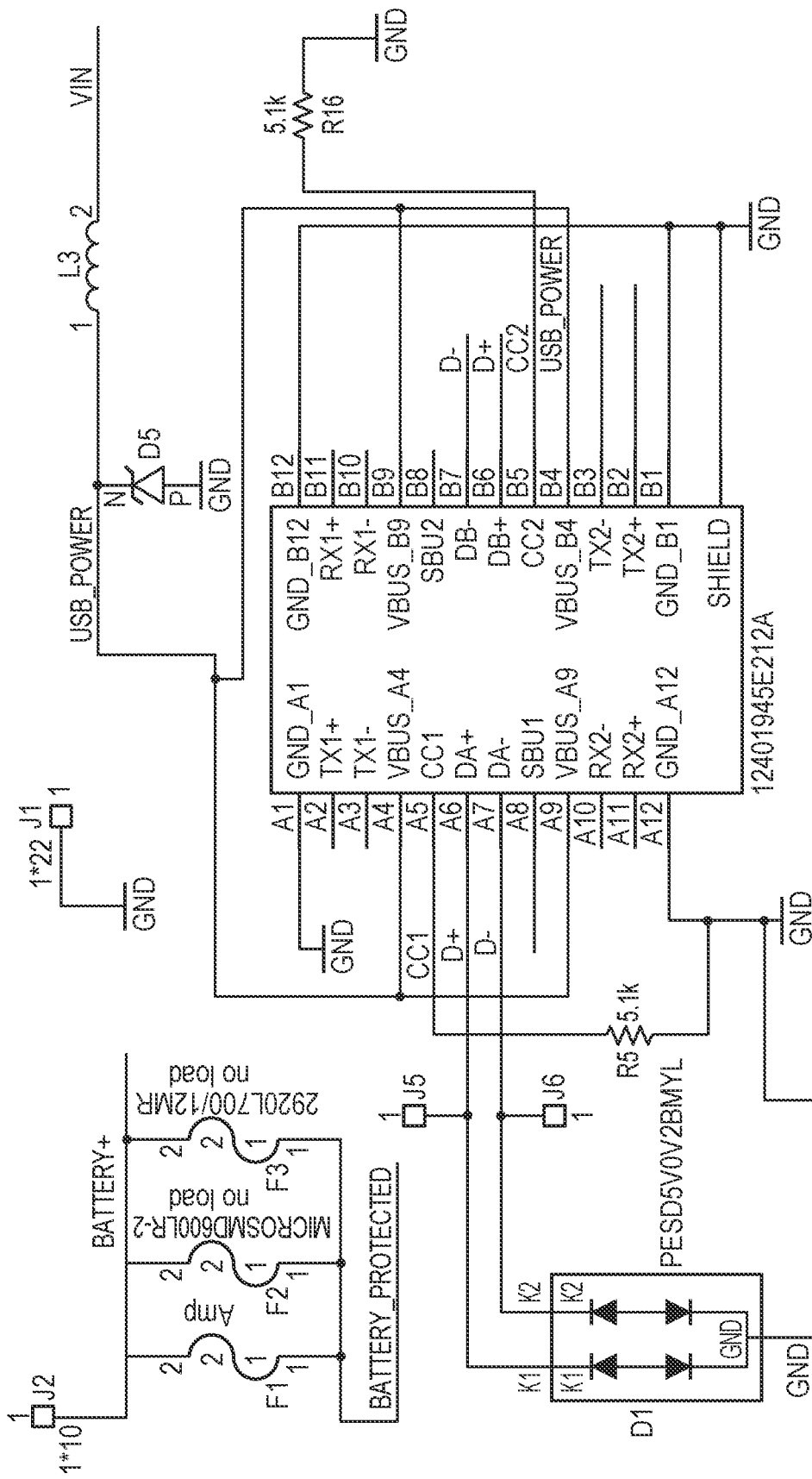
FIG. 14 is another detailed circuit diagram of the power converter circuit showing additional electrical components.

FIG. 14 is another detailed circuit diagram of the power converter circuit 16 showing additional electrical components.

Figures 15, 16:
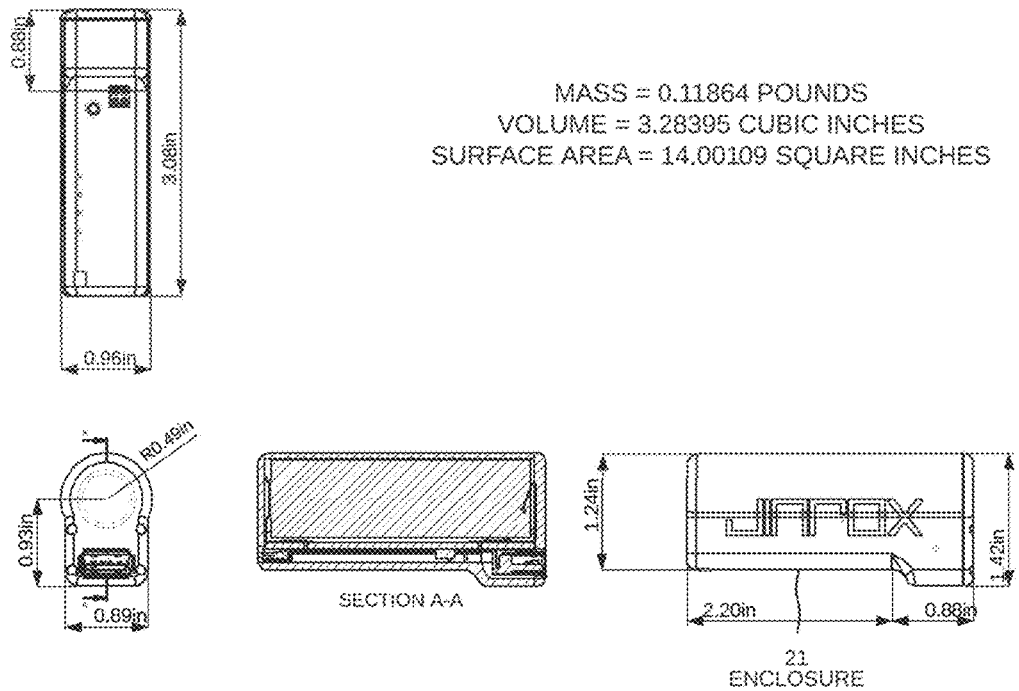
FIG. 15 is a diagram showing dimensions of the enclosure in one embodiment.
FIG. 16 is a diagram of a table showing operating characteristics of the mobile device charger in accordance with one embodiment.

FIG. 15 is a diagram showing dimensions of the enclosure 21 in one embodiment.

FIG. 16 is a diagram of a table 49 showing operating characteristics of the mobile device charger in accordance with one embodiment.

Figures 17, 18, 19, 20:
FIGS. 17-19 are diagrams showing examples of commercially available mobile chargers.
FIG. 20 is a comparison table showing operating characteristics of the conventional mobile chargers and the novel mobile device charger.

FIGS. 17-19 are diagrams showing commercially available mobile chargers. During operation, each of the conventional mobile chargers outputs less power per unit volume as compared to the novel mobile device charger 11 shown in FIG. 1.

FIG. 20 is a comparison table 50 showing operating characteristics of the conventional mobile chargers (e.g. FIGS. 17-19) and the novel mobile device charger 11. As shown in table 50, the mobile device charger 11 outputs more than three watts per cubic inch.

Figure 21:
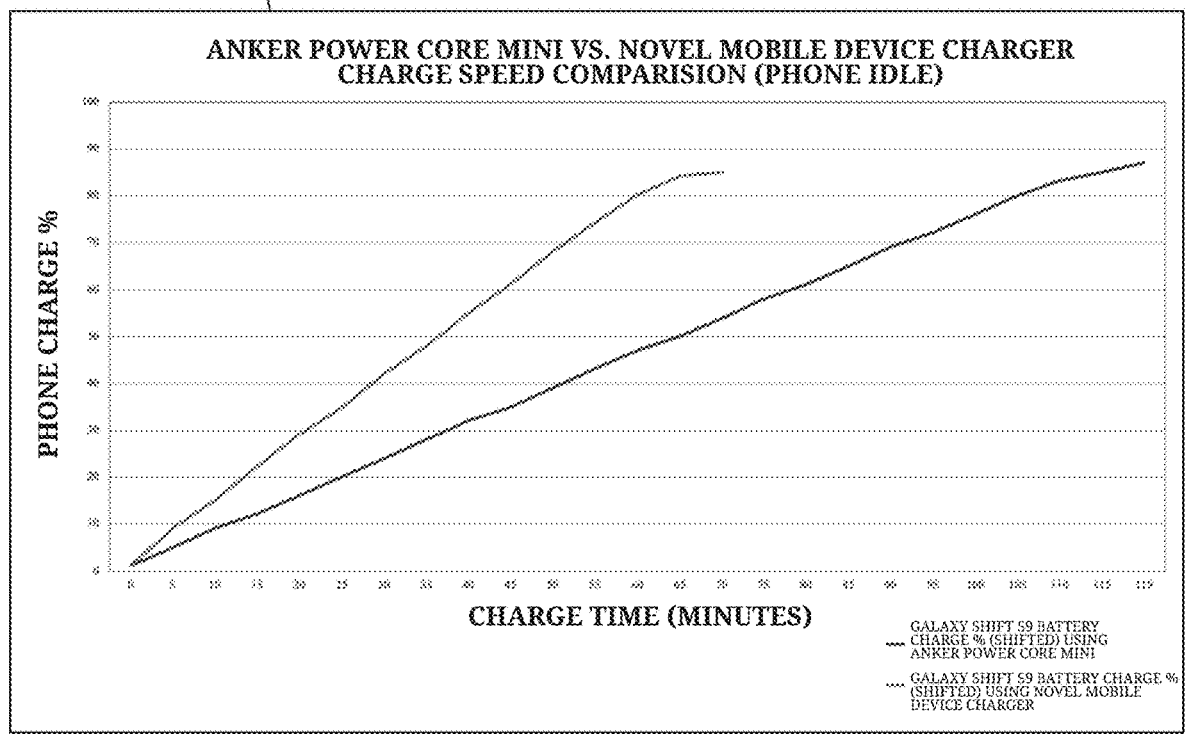
FIG. 21 is a graph showing mobile device charge during a charging time period.

FIG. 21 is a graph showing mobile device 11 charge during a charging time period. Plot 51 shows charging of mobile device 14 using the mobile device charger 11. Plot 52 shows charging of mobile device 14 using prior art chargers. The mobile device charger 11 reduces charging of the mobile device by nearly half as compared to the conventional chargers.

Figure 22:
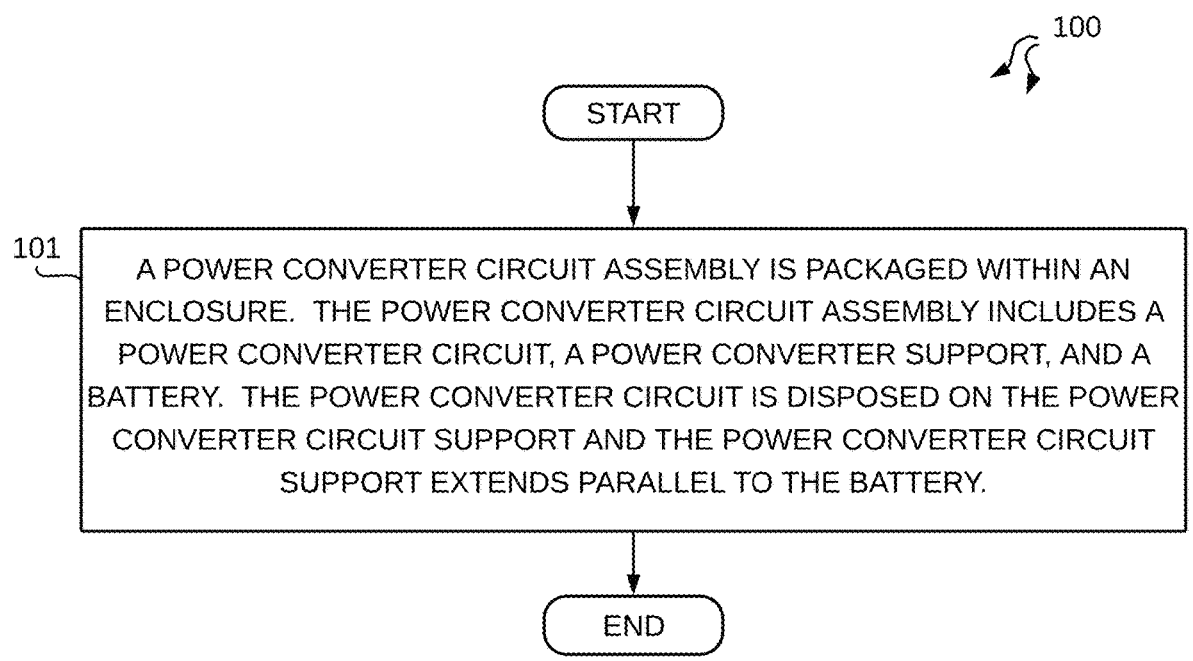
FIG. 22 is a flowchart of a method 100 in accordance with at least one novel aspect.

FIG. 22 is a flowchart of a method 100 in accordance with at least one novel aspect. In a first step (step 101), a power converter assembly that includes a power converter circuit disposed on a power converter circuit support, and a battery is packed within an enclosure. The power converter circuit support extends parallel to the battery.

Figure 23:
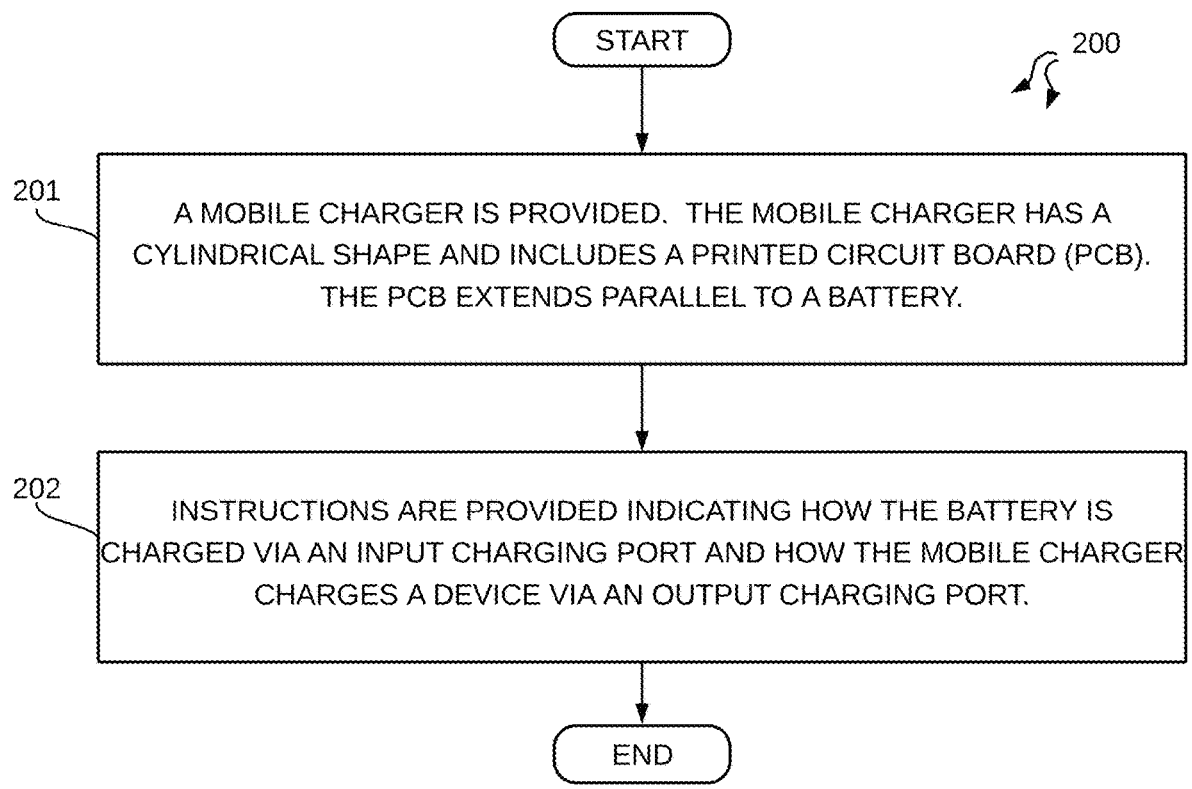
FIG. 23 is a flowchart of a method 200 in accordance with at least one novel aspect.

FIG. 23 is a flowchart of a method 200 in accordance with at least one novel aspect. In a first step (step 201), a cylindrical shaped mobile charger is provided. The mobile charger includes a printed circuit board (PCB) that extends parallel to a battery. In a second step (step 202), instructions are provided that indicate how the battery is charged via an input charging port and how the mobile charger charges a device via an output charging port.

Although certain specific embodiments are described above for instructional purposes, the teachings of this patent document have general applicability and are not limited to the specific embodiments described above. In other embodiments, the battery 12 is a protected battery with additional power management circuitry. Accordingly, various modifications, adaptations, and combinations of various features of the described embodiments can be practiced without departing from the scope of the invention as set forth in the claims.

What is claimed is:

1. An apparatus comprising:
a power converter circuit support structure;
a power converter circuit that is disposed on the power converter circuit support structure, wherein the power converter circuit comprises a first input terminal and a second input terminal;
a first battery connector, wherein the first battery connector is coupled to the first input terminal of the power converter circuit;
a second battery connector, wherein the second battery connector is coupled to the second input terminal of the power converter circuit, and wherein when a battery is connected between the first battery connector and the second battery connector, the power converter circuit support structure is adjacent and extends parallel to the battery;
a first charging port, wherein the first charging port is selected from the group consisting of: a Universal Serial Bus (USB) type-A port, a USB type-C port, a micro-USB port, and a lightning port, and wherein when a battery is connected between the first battery connector and the second battery connector, the battery is charged via the first charging port;

a second charging port, wherein the second charging port is selected from the group consisting of: a Universal Serial Bus (USB) type-A port, a USB type-C port, a micro-USB port, and a lightning port, and wherein the output charging supply output by the power converter circuit charges a device via the second charging port; and a connector connectable to a molded cable that charges the device.

2. The apparatus of claim 1, wherein the device is charged at a maximum current level of at least two amperes (2A) during a charging time period.

* * * * *